United States Patent [19]
Forsythe

[11] Patent Number: 5,280,829
[45] Date of Patent: Jan. 25, 1994

[54] SPLIT TUBE HAVING RETAINABLE ENDS

[75] Inventor: Bobbie G. Forsythe, Wichita Falls, Tex.

[73] Assignee: Dana Corporation, Toledo, Ohio

[21] Appl. No.: 931,638

[22] Filed: Aug. 18, 1992

[51] Int. Cl.$^5$ .............. F16D 25/04; F15B 15/00; F16J 3/00
[52] U.S. Cl. .................. 192/70.13; 92/92; 192/88 A
[58] Field of Search ............... 192/88 A, 88 B, 88 R, 192/70.13; 92/92; 156/69; 264/263; 188/366; 441/123, 122

[56] References Cited

U.S. PATENT DOCUMENTS

| | | | |
|---|---|---|---|
| 574,269 | 12/1896 | Richards | 192/88 A |
| 2,141,645 | 12/1938 | Fawick | 192/88 B X |
| 2,251,443 | 8/1941 | Fawick | 192/88 B |
| 2,395,239 | 2/1946 | White et al. | 192/88 A |
| 2,473,646 | 6/1949 | Hollerith | |
| 2,887,202 | 5/1959 | Wilson | 192/88 A X |
| 3,002,597 | 10/1961 | Warman et al. | 192/87.15 |
| 3,258,369 | 6/1966 | Blaich | 264/263 |
| 3,362,302 | 1/1968 | Friedman | 264/263 X |
| 3,698,961 | 10/1972 | Niemann | 156/69 X |
| 4,497,398 | 2/1985 | Patel | 192/88 B |
| 4,512,450 | 4/1985 | Babcock | 192/12 R |
| 4,746,381 | 5/1988 | Parker et al. | 156/69 |
| 5,031,739 | 7/1991 | Flotow et al. | 192/13 R |
| 5,158,511 | 10/1992 | Mungo | 192/70.13 X |

FOREIGN PATENT DOCUMENTS

| | | | |
|---|---|---|---|
| 0209738 | 11/1955 | Australia | 192/88 A |
| 0333798 | 12/1903 | France | 441/122 |

Primary Examiner—Rodney H. Bonck
Attorney, Agent, or Firm—Dykema Gossett

[57] ABSTRACT

A split tube for use in a fluid friction assembly, such as a clutch or brake, includes a tube body with end caps disposed at each end. The end caps seal the ends of the tube, and further provide a device to connect the two end caps. This arrangement allows the tube to be placed about the shaft of a friction assembly, and then formed into a continuous ring. The ends of the tube are connected, and will not be flung radially outwardly at high rotational speeds.

20 Claims, 2 Drawing Sheets

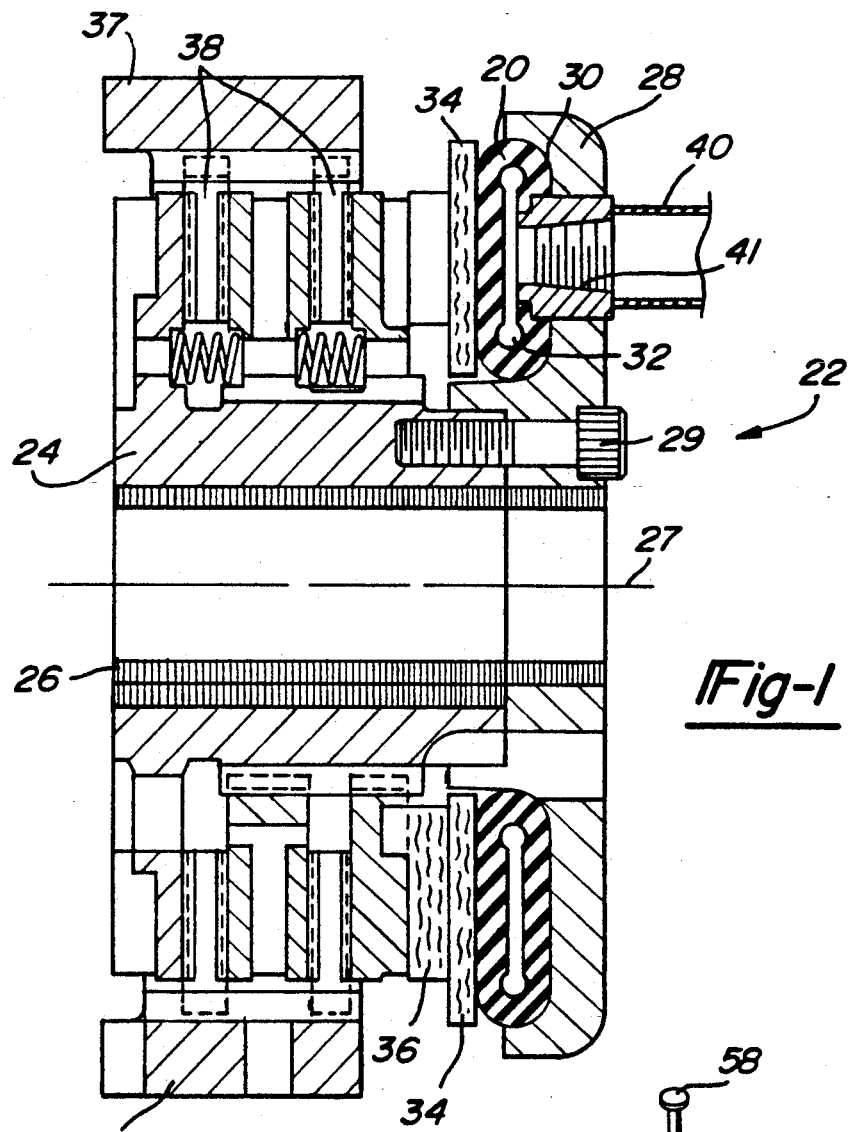
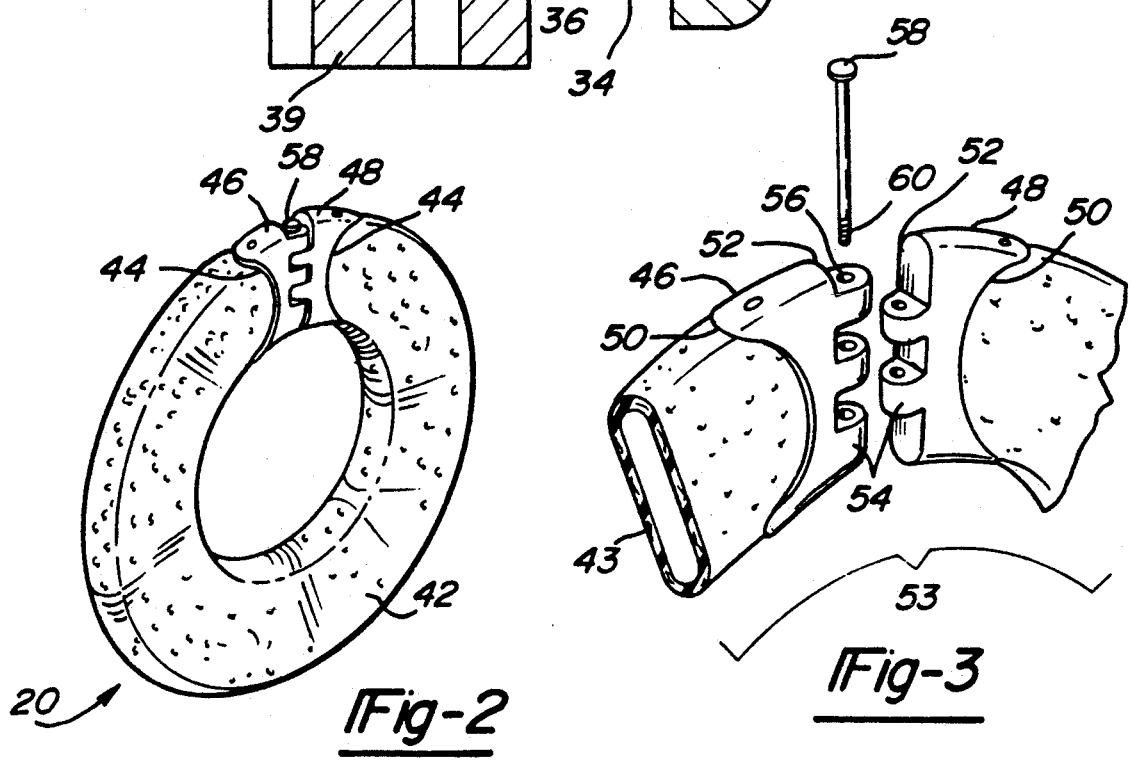
Fig-1
Fig-2
Fig-3

SPLIT TUBE HAVING RETAINABLE ENDS

BACKGROUND OF THE INVENTION

This invention relates generally to an improved structure for a flexible tube adapted for use in a fluid clutch, brake or other friction assembly.

One known type of fluid friction assembly utilizes a torus-shaped flexible tube. The tube is expanded by fluid under pressure resulting in the selective engagement of friction discs, which in turn transmit or absorb rotational torque. The tube rotates in a clutch assembly about the shaft of the clutch. Over time the tube may deteriorate, and require replacement.

Replacing the original tube with another torus-shaped tube often requires significant disassembly of the clutch, since the tube is positioned about the shaft. Time to disassemble the clutch, however, is not always available. Therefore, replacement tubes, having a generally toroidal shape, are split and have two ends. This allows a tube to be placed over the shaft. Known split tubes operate satisfactorily only when the clutch is operated at less than full speed. At full speed, the loose ends of the split tube may be flung radially outwardly, preventing proper operation of the clutch.

The prior art has attempted to overcome these difficulties by taping, or applying other adhesives to secure the ends of the split tube together. These methods have not, however, provided a consistently effective replacement tube capable of operation at high rotational speeds. Thus, prior art split tubes have typically only been used as temporary replacements in most industrial clutches.

SUMMARY OF THE INVENTION

In a disclosed embodiment of the present invention, a split tube has two ends to allow the split tube to be placed over the shaft of into a friction assembly. The ends are then connected to form the split tube into a continuous ring, thus preventing the ends of the split tube from being flung radially outwardly.

In a preferred embodiment, each end of the split tube is attached to an end cap. The end cap includes a generally circular recess which is adapted to receive an extreme end of the split tube. Each end cap includes a retaining means to selectively connect one end cap to the other end cap.

In a method of replacing a prior art split tube, the inventive split tube is placed around the shaft of the clutch or friction assembly, and formed into a continuous ring by connecting the end caps. The tube then serves as a permanent replacement, allowing the clutch to operate at full speed. Further, the tube is easy and quick to install, preventing extensive down time for the clutch.

These and other features of the present invention can best be understood from the following specification and drawings, of which the following is a brief description.

BRIEF DESCRIPTION OF DRAWINGS

FIG. 1 is a cross-sectional view of a fluid clutch assembly incorporating the present invention.

FIG. 2 is a perspective view of a split air tube.

FIG. 3 is a fragmentary perspective view of the split air tube illustrating end caps.

DETAILED DESCRIPTION OF THE PREFERRED EMBODIMENT

Figure 4:
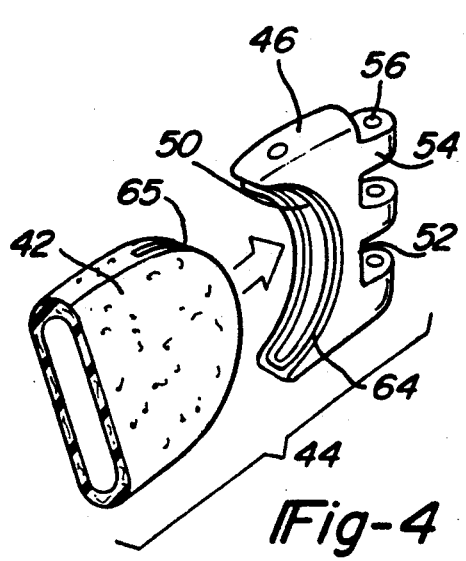
FIG. 4 is an exploded view of the split air tube and an end cap.

Referring now to FIG. 1, an inventive air tube 20 is shown within a fluid clutch assembly 22. A hub 24 and a shaft 26 rotate as a unit about a central longitudinal axis 27 of clutch assembly 22. A holding plate 28 is connected to an end of hub 24 by one or more bolts 29, and extends radially outwardly from longitudinal axis 27. Holding plate 28 provides a seat 30 for the air tube 20. A cavity 32 within air tube 20 is selectively expanded to cause axial movement of a pressure plate 34 and an abutting back plate 36, resulting in the engagement of friction discs 38. This allows selective transmission of rotation between a driving ring 39 and shaft 26. With the clutch assembly, air tube 20 also rotates. Fluid pressure is selectively applied to air tube 20 from a pump hose 40 communicating with cavity 32 through opening 41.

Although the air tube 20 is disclosed in a clutch, it should be understood it would also provide benefits in a brake or other friction assembly. Further, it should be understood that the air tube 20 could be expanded by any fluid.

The air tube originally installed in the clutch assembly 22 is typically torus-shaped. As explained above, replacement with another torus-shaped air tube requires the clutch assembly 22 to be disassembled, thus requiring operational down time. Therefore, replacement air tubes typically have a generally toroidal shape, and two split ends allowing the tube to be placed about the shaft 26 without disassembling the clutch assembly 22. The present invention solves the problem of these ends being flung radially outwardly during high speed rotation.

As illustrated in FIG. 2, split air tube 20 includes a tube or tubular body 42 having two open extreme ends, discussed below. Air tube body 42 is formed of an oval cylindrical wall 43 defining cavity 32. One extreme end of tube body 42 is secured to a first end cap 46 to form end 44, and the other extreme end is secured to a second end cap 48 to form end 44. End caps 46 and 48 provide a seal and are secured together forming the tube body 42 into a continuous ring.

A method of replacing a first tube originally secured within clutch assembly 22 with the split air tube 20 will be described with reference to FIGS. 1 and 2. The method includes the removal of bolts 29 which secure holding plate 28 to hub 24. The holding plate 28 is then displaced axially along shaft 26 providing access to the first tube in order to cut and remove it. The inventive air tube 20 is then placed about hub 24. End caps 46 and 48 are connected together forming air tube 20 into a continuous ring about hub 24. Holding plate 28 is then returned to its original position and secured to hub 24 by bolts 29.

As shown in FIG. 3, end caps 46 and 48 include a back portion 50 and a front portion 52. Back portions 50 receive an extreme end 65 of the tube body 42. The front portion 52 includes a retaining means 53 which allows the first and second end caps 46 and 48 to be connected. The front portion 52 of each end cap includes circumferentially extending fingers 54, with the fingers on the two end caps being radially staggered such that they will be circumferentially overlapped when connected, as shown in FIG. 2. Apertures 56 in fingers 54 allow a radial pin 58 to pass therethrough. Radial pin 58 includes a threaded portion 60, which is threadably received within a lowermost finger 54, as will be explained below. The overlapped fingers 54 and radial pin 58 connect the first end cap 46 to the second end cap 48.

As discussed above, the air split air tube 20 rotates when used in a clutch friction assembly. Due to the rotation of the split air tube 20, inertia problems may result if the entire tube does not have the same relative density. Therefore, end caps 46 and 48 preferably have the same relative density as tube body 42.

Referring to FIG. 4, a recess 64 is formed in the back portion 50 of end cap 46. End cap 48 has a similar structure. The extreme end 65 of tube body 42 is received within recess 64 to define an end 44.

Figure 5:
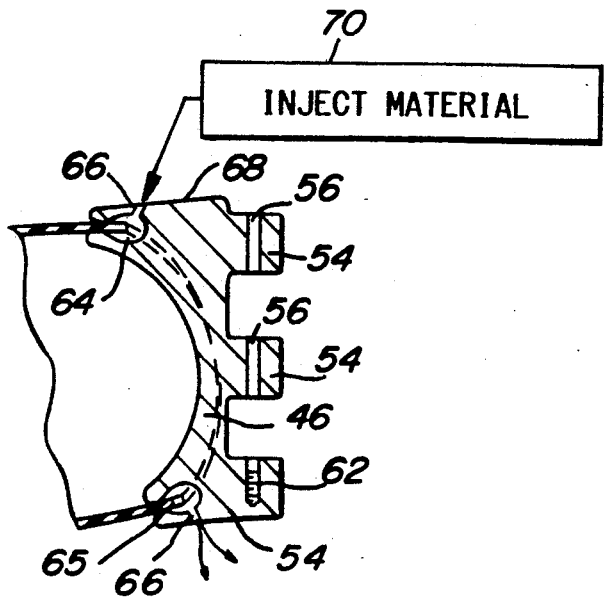
FIG. 5 is a cross-sectional view of a step in the manufacture of the inventive split air tube.

As shown in FIG. 5, the end caps include ports 66 extending inwardly from an outer surface 68 to intersect recess 64. Preferably, a plurality of ports 66 permit both the injection of elastomer material 70 and the release of pressure as the recess 64 is filled. Also shown is a threaded bore 62 formed in an end finger 54 to receive the threaded end of radial pin 58. Further, it can be seen that the extreme end 65 of tube body 42 is open, and is closed off by end cap 46.

Figure 6:
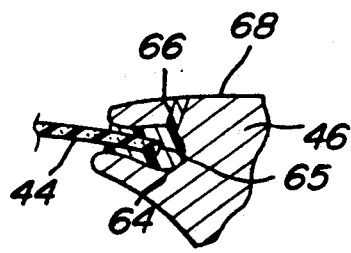
FIG. 6 is a fragmentary cross-sectional view of the split air tube and end cap.

As shown in FIG. 6, a curable elastomer material 70 is injected into ports 66 to fill recess 64 and secure extreme end 65 of tube body 42 to the end cap 46. As the material 70 cures, end cap 46 is bonded to extreme end 65, effecting a seal. The material injected is preferably a variation of the elastomer material used to form tube body 42. However, any material which is injectable and which properly bonds with tube body 42 may be used.

Figure 7:
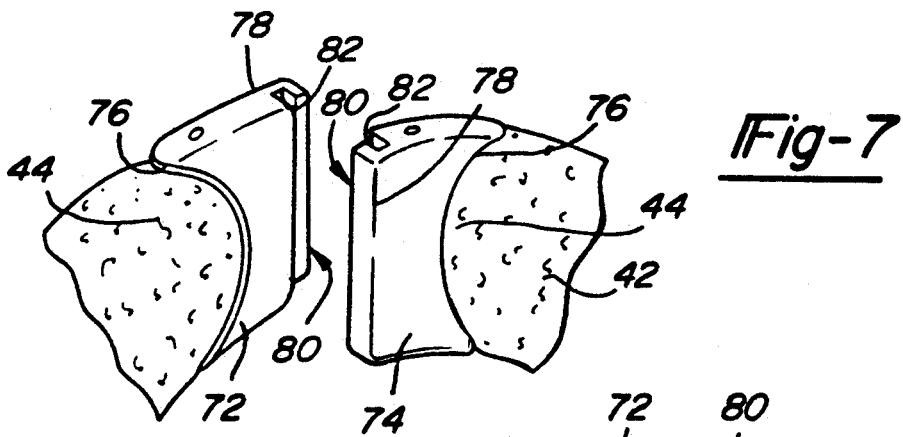
FIG. 7 is a perspective view of an alternate embodiment of the present invention.

An alternative embodiment to the present invention is illustrated in FIG. 7 having end caps 72 and 74. The end caps 72 and 74 each include a back portion 76 adapted to receive an extreme end of the tube body 42, and a front portion 78 having a retaining means. End caps 72 and 74 include a double latching arrangement such that each end cap includes both an L-shaped latching member 80 and a receiving channel 82.

Figure 8:
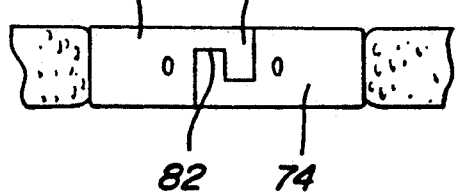
FIG. 8 is a plan view of the engaged end caps of FIG. 7.

As shown in FIG. 8, the L-shaped latching member 80 of each end cap 72 and 74 is received within channel 82 of the other end cap to form the split air tube 20 into a continuous ring.

It is also known in the art to utilize two semi-circular tube bodies within a clutch or brake assembly. It is envisioned that this invention may also be used with a plurality of tube bodies, each having end caps disposed on the ends of the tube bodies, and connected to form the tube bodies into a continuous ring. Further, although a tube body 42 having open extreme ends 65 is described, a tube body having closed ends which are secured within end caps could also be used.

In one known embodiment, neoprene rubber is used to form the tube. A compatible neoprene rubber compound is then injected to form the ends of the tube to the end caps. In other known embodiments, silicon, synthetic rubber, or natural rubber are used.

Preferred embodiments of the present invention have been disclosed. A worker of ordinary skill in the art, however, would recognize that certain modifications would come within the scope of this invention. For that reason, the following claims should be studied in order to determine the true scope and content of this invention.

What is claimed is:

1. A tube adapted to be expanded to actuate a friction assembly, comprising:
    a tube body having walls defining a cavity and two ends; and
    first and second end caps secured to said ends, said end caps being selectively connected together to form said tube body into a continuous ring, said end caps including circumferentially extending fingers, said fingers of said first end cap circumferentially overlapping said fingers of said second end cap, said fingers having apertures extending therethrough and a pin extending through said apertures to secure said second end cap to said first end cap.

2. The tube as recited in claim 1, wherein said tube body includes open ends, said first end cap closing and providing a seal for one of said ends and said second end cap closing and providing a seal for the other of said ends.

3. The tube as recited in claim 1, wherein each of said end caps include a recess receiving an end of said tube body which is secured in said recess by a curable material.

4. The tube as recited in claim 3, wherein said recess includes a port extending inwardly from an outer surface of said end cap and intersecting said recess, said port allowing injection of said curable material into said recess.

5. The tube as recited in claim 1, wherein said pin includes a threaded portion, and one of said fingers includes a threaded bore adapted to receive said threaded portion for locking said pin therein.

6. The tube as recited in claim 1, wherein said tube is adapted to be installed in a clutch.

7. A tube adapted to be expanded to actuate a friction assembly, comprising:
    a tube body having walls defining a cavity and two ends; and
    first and second end caps secured to said ends, said end caps being selectively connected together to form said tube body into a continuous ring, said first and second end caps each having an L-shaped latching member and a channel member, with the L-shaped member of each end cap being received in the channel member of the other end cap to connect said end caps.

8. The tube as recited in claim 7, wherein said tube body includes open ends, said first end cap closing and providing a seal for one of said ends and said second end cap closing and providing a seal for the other of said ends.

9. The tube as recited in claim 7, wherein each of said end caps include a recess receiving an end of said tube body which is secured in said recess by a curable material.

10. The tube as recited in claim 9, wherein said recess includes a port extending inwardly from an outer surface of said end cap and intersecting said recess, said port allowing injection of said curable material into said recess.

11. The tube as recited in claim 7, wherein said tube is adapted to be installed in a clutch.

12. A friction assembly comprising:
    a hub extending along a longitudinal axis;

a holding plate extending radially outwardly of said longitudinal axis, and being fixed to said hub;

a pressure plate longitudinally spaced from said holding plate;

a tube received between said holding plate and said pressure plate, said tube including a tubular body having an expandable cavity and having two ends, said body including an opening to receive a fluid;

first and second end caps secured to said ends of said tube adapted to provide a seal, said end caps being selectively connected together to form said tube into a continuous ring, said end caps including circumferentially extending fingers, the fingers of said first end cap circumferentially overlapping the fingers of said second end cap, said fingers having apertures extending therethrough and a pin extending through said apertures to secure said second end cap to said first end cap; and friction discs longitudinally spaced from said pressure plate in a direction away from said tube, said tube being adapted to expand and contract resulting in axial movement of said pressure plate to selectively engage and disengage said friction discs.

13. The friction assembly as recited in claim 12, wherein said end caps each include a recess, with one end of said tube being secured in said recess by a curable material.

14. The friction assembly as recited in claim 13, wherein said recess includes a port extending inwardly from an outer surface of said end cap and intersecting said recess, said port allowing injection of said curable material into said recess.

15. The friction assembly as recited in claim 12, wherein said pressure plate transmits rotation to said friction discs.

16. A friction assembly comprising:

a hub extending along a longitudinal axis;

a holding plate extending radially outwardly of said longitudinal axis, and being fixed to said hub;

a pressure plate longitudinally spaced from said holding plate;

a tube received between said holding plate and said pressure plate, said tube including a tubular body having an expandable cavity and having two ends, said body including an opening to receive a fluid;

first and second end caps secured to said ends of said tube adapted to provide a seal, said end caps being selectively connected together to form said tube into a continuous ring, said first end cap including a latching member and said second end cap including a channel member, said latching member being selectively engagable in said channel member to connect said end caps; and friction discs longitudinally spaced from said pressure plate in a direction away from said tube, said tube being adapted to expand and contract resulting in axial movement of said pressure plate to selectively engage and disengage said friction discs.

17. The friction assembly as recited in claim 16, wherein said latching member of said first end cap is L-shaped and said first end cap further includes a channel member, and said second end cap includes an L-shaped latching member, with the L-shaped member of each end cap being received in the channel member of the other end cap to connect said end caps.

18. The friction assembly as recited in claim 16, wherein said end caps each include a recess, with one end of said tube being secured in said recess by a curable material.

19. The friction assembly as recited in claim 18, wherein said recess includes a port extending inwardly from an outer surface of said end cap and intersecting said recess, said port allowing injection of said curable material into said recess.

20. A method for replacing a first tube originally secured within a friction assembly with a second tube, said tubes disposed about a shaft and adapted to be expanded to result in the engagement of friction discs, comprising the steps of:

(a) removing said first tube from said friction assembly;

(b) placing said second tube about said shaft, said second tube having two unconnected ends, each of said ends of said second tube having an end cap sealing said end; and (c) connecting one of said end caps directly to the other of said end caps to form said second tube into a continuous generally toroidal shape within said friction assembly.

* * * * *